United States Patent
Lin

(10) Patent No.: US 9,921,672 B2
(45) Date of Patent: Mar. 20, 2018

(54) ELECTRONIC DEVICES, NEAR FIELD COMMUNICATION METHODS AND NEAR FIELD COMMUNICATION SYSTEMS

(71) Applicant: MediaTek Inc., Hsin-Chu (TW)

(72) Inventor: Yu-Han Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 62 days.

(21) Appl. No.: 14/529,463

(22) Filed: Oct. 31, 2014

(65) Prior Publication Data

US 2015/0212636 A1   Jul. 30, 2015

Related U.S. Application Data

(60) Provisional application No. 61/932,346, filed on Jan. 28, 2014.

(51) Int. Cl.
*G06F 3/041* (2006.01)
*G06F 3/044* (2006.01)
*H04B 5/00* (2006.01)

(52) U.S. Cl.
CPC ............ *G06F 3/0412* (2013.01); *G06F 3/044* (2013.01); *G06F 3/0416* (2013.01); *H04B 5/0012* (2013.01); *H04B 5/0025* (2013.01); *H04B 5/0031* (2013.01); *G06F 2203/04101* (2013.01); *G06F 2203/04106* (2013.01); *G06F 2203/04108* (2013.01)

(58) Field of Classification Search
CPC .................. G06F 3/044; G06F 3/0416; G06F 2203/04108
See application file for complete search history.

(56) References Cited

U.S. PATENT DOCUMENTS

| 7,357,646 B1* | 4/2008 | Chen ...................... H05K 1/141 439/70 |
| 8,717,325 B1* | 5/2014 | Hermes ................. G06F 3/0416 345/173 |
| 8,947,305 B2 | 2/2015 | Amm et al. |
| 9,105,967 B2 | 8/2015 | Park |
| 2004/0105040 A1* | 6/2004 | Oh ....................... G02F 1/13338 349/12 |

(Continued)

FOREIGN PATENT DOCUMENTS

| CN | 101958455 A | 1/2011 |
| CN | 102916729 | 2/2013 |

(Continued)

OTHER PUBLICATIONS

English language machine translation of CN 102916729 (published Feb. 6, 2013).

*Primary Examiner* — Nelson Rosario
*Assistant Examiner* — Chun-Nan Lin
(74) *Attorney, Agent, or Firm* — McClure, Qualey & Rodack, LLP

(57) ABSTRACT

A first electronic device includes a display unit, a first conductive unit and a processing circuit. The first conductive unit is configured for transmitting a first signal to a second conductive unit of a second electronic device when the first conductive unit is in proximity with the second conductive unit. The processing circuit is configured for providing the first signal to the conductive unit. The first conductive unit includes a transmitting electrode and a receiving electrode.

20 Claims, 10 Drawing Sheets

(56) References Cited

U.S. PATENT DOCUMENTS

| | | | |
|---|---|---|---|
| 2007/0239981 A1* | 10/2007 | Lessing | G06K 7/10237 713/164 |
| 2009/0207151 A1* | 8/2009 | Liu | G06F 3/044 345/174 |
| 2011/0304583 A1* | 12/2011 | Kruglick | G06F 3/044 345/174 |
| 2013/0016065 A1* | 1/2013 | Reynolds | G06F 3/0412 345/174 |
| 2013/0147760 A1* | 6/2013 | Lai | H04B 5/0012 345/174 |
| 2013/0194759 A1 | 8/2013 | Kang et al. | |
| 2013/0231046 A1 | 9/2013 | Pope et al. | |
| 2013/0249850 A1* | 9/2013 | Bulea | G06F 3/044 345/174 |
| 2013/0278540 A1* | 10/2013 | Yilmaz | G06F 3/0416 345/174 |
| 2014/0199944 A1 | 7/2014 | Ran et al. | |

FOREIGN PATENT DOCUMENTS

| | | | |
|---|---|---|---|
| CN | 103199882 A | 7/2013 | |
| KR | 1448102 B1 * | 5/2013 | G06F 3/044 |

\* cited by examiner

ELECTRONIC DEVICES, NEAR FIELD COMMUNICATION METHODS AND NEAR FIELD COMMUNICATION SYSTEMS

CROSS REFERENCE TO RELATED APPLICATIONS

This application claims the benefit of U.S. Provisional Application No. 61/932,346 filed 2014 Jan. 28. The entire contents of which are hereby incorporated by reference.

BACKGROUND OF THE INVENTION

Field of the Invention

The invention relates to devices and methods for near field communication, and more particularly to devices and methods for near field communication based on touch link technology.

Description of the Related Art

NFC (Near Field Communication) is a contactless identification and interconnection technology, which allows users to intuitively exchange information and access content and services among mobile devices, consumer electronics, personal computers, or intelligent electronic devices using methods of near magnetic field communication, such as using 13.56 MHz of near magnetic field communication.

Since the market demand for integrated NFC in handheld devices such as mobile phones is mature, NFC now supports mobile payment or can act as a point-of-sale (POS) system. However, since NFC is established based on magnetic fields to transmit and receive signals, it is necessary to install inductive card readers or some components with a similar function in handheld devices or mobile phones to support NFC, which causes the handheld devices to become bigger and is a limitation to the layout structure and component material of the mobile phones and other handheld devices.

Along with the development of touch-sense technology, touch-controlled panel devices have become more and more popular. In an application of touch-sense technology, a touch-controlled panel device can detect and respond to contacts of a user. Besides the touch-sense technology, there is a recently developed "touch link technology" for a touch-controlled panel device, such as that recited in patent applications US 2011/0304583, US 2013/0147760, and CN 102916729A, which implements near field wireless communication by trying to utilize the existing touch-controlled panel and the corresponding hardware devices. Generally, a touch-controlled panel device includes a touch panel, a signal processing circuit and a central processing unit (CPU). For example, the touch-controlled panel device may contain a touch pad without display function or a touch screen with display function. The touch-controlled panel device may include a touch sensor. The touch sensor includes a plurality of driving electrodes and a plurality of sensing electrodes on a substrate. The touch-controlled panel device is usually implemented by coating Indium Tin Oxide (ITO) materials on a dielectric such as glass. The signal processing circuit is usually implemented by integrated circuit (IC). The signal processing circuit provides two main functions. One is performing analog to digital conversion, demodulation, or other signal processing procedures on the analog signals received from the touch panel, and then transmitting the processed signals to the CPU. Another is receiving digital signals from the CPU, performing modulation, digital to analog conversion, or other signal processing procedures on the received digital signals and then transmitting the processed signals to the touch panel. In an application of touch-sense technology, when user touches the touch-controlled panel device by his finger or a stylus, corresponding analog signals are generated by touching the driving electrodes and sensing electrodes via the touch sensor. The signals are transmitted to the CPU after being processed by the signal processing circuit. The CPU calculates the position where the user touches via proper algorithm(s) and responses to the contacts of the user. In the application of touch link technology, at least one of the driving electrode and the sensing electrode can act as a transmitting electrode for transmitting signals, and at least one of the driving electrode and the sensing electrode can act as a receiving electrode for receiving signals. When transmitting signals, a touch-controlled panel device can modulate and process the signal to be transmitted by the signal processing circuit, and transmit the processed signals to another touch-controlled panel device via the transmitting electrode by electric field coupling. The receiving electrode of the another touch-controlled panel device receives the transmitted signal. When receiving signals, a touch-controlled panel device can receive a signal via the receiving electrode by electric field coupling, demodulate the signals by the signal processing circuit, and then transmit the processed signal to the processor for further processing. Therefore, the signals can be transmitted and received by using the original electrodes to realize touch transmission based on electric fields without an inductive card reader or components with a similar function being incorporated. Compared to the conventional NFC technology, the touch link technology reduces both volume and cost. This is because some of the existing hardware may be reused. For system developers, the additional effort may be some software and/or firmware revision and porting so as to enable the existing hardware support touch link technology. For example, a protocol may be needed when using touch link technology to transmit and/or receive data; the software may be modified to implement the protocol. Of course, touch link technology also works when not using the existing hardware such as the existing touch-controlled panel device, but when using another touch-controlled panel and the signal processing circuit to realize touch link technology. In addition, in an application of the touch sense technology, there are two common types of touch-controlled panel device, including the capacitive touch and resistive touch. For the applications of touch link technology, besides the capacitive type of touch-controlled panel device, the resistive type of touch-controlled panel device can also be used to realize the touch link technology.

BRIEF SUMMARY OF THE INVENTION

Electronic devices, near field communication methods and near field communication systems are provided. An embodiment of a first electronic device comprises a display unit, a first conductive unit and a processing circuit. The first conductive unit is configured for transmitting a first signal to a second conductive unit of a second electronic device when the first conductive unit is in proximity with the second conductive unit. The processing circuit is configured for providing the first signal to the conductive unit. The first conductive unit comprises a transmitting electrode and a receiving electrode.

In an embodiment of the first electronic device, the first conductive unit is further configured for receiving a second signal from the second conductive unit of the second electronic device.

In an embodiment of the first electronic device, the first conductive unit is a flexible printed circuit (FPC).

In an embodiment of the first electronic device, the first conductive unit is a printed circuit board (PCB) hidden from view.

In an embodiment of the first electronic device, the first conductive unit is deployed on one of the front, rear, left, right, top, and bottom side of the first electronic device.

In an embodiment of the first electronic device, the display unit is a touch panel, and the first conductive unit and the touch panel are deployed on different sides of the first electronic device.

In an embodiment of the first electronic device, when the first conductive unit transmits the first signal, the touch panel is operative to detect touch event.

In an embodiment of the first electronic device, the touch panel comprises a transmitting electrode configured for transmitting a third signal and a receiving electrode, configured for receiving a fourth signal.

In an embodiment of the first electronic device, the first conductive unit is detachable from the first electronic device.

An embodiment of a near field communication method for using in a first electronic device comprises: detecting at least one touch event via a touch panel of the first electronic device; and transmitting, according to the at least one touch event, a signal by a first conductive unit to a second conductive unit when the first conductive unit is in proximity with the second conductive unit. The first conductive unit comprises a transmitting electrode and a receiving electrode.

In an embodiment of a near field communication method, the first conductive unit is a flexible printed circuit or a printed circuit board.

In an embodiment of a near field communication method, the first conductive unit and the touch panel of the first electronic device are deployed on different sides of the first electronic device.

In an embodiment of a near field communication method, the second conductive unit is one of a touch panel, flexible printed circuit, and a printed circuit board.

In an embodiment of a near field communication method, the first conductive unit is deployed on one of the front, rear, left, right, top, and bottom side of the first electronic device.

In an embodiment of a near field communication method, the first conductive unit is on a dongle electrically coupled to the first electronic device through an interface.

In an embodiment of a near field communication method, the second conductive unit is deployed on one of the front, rear, left, right, top, and bottom side of a second electronic device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
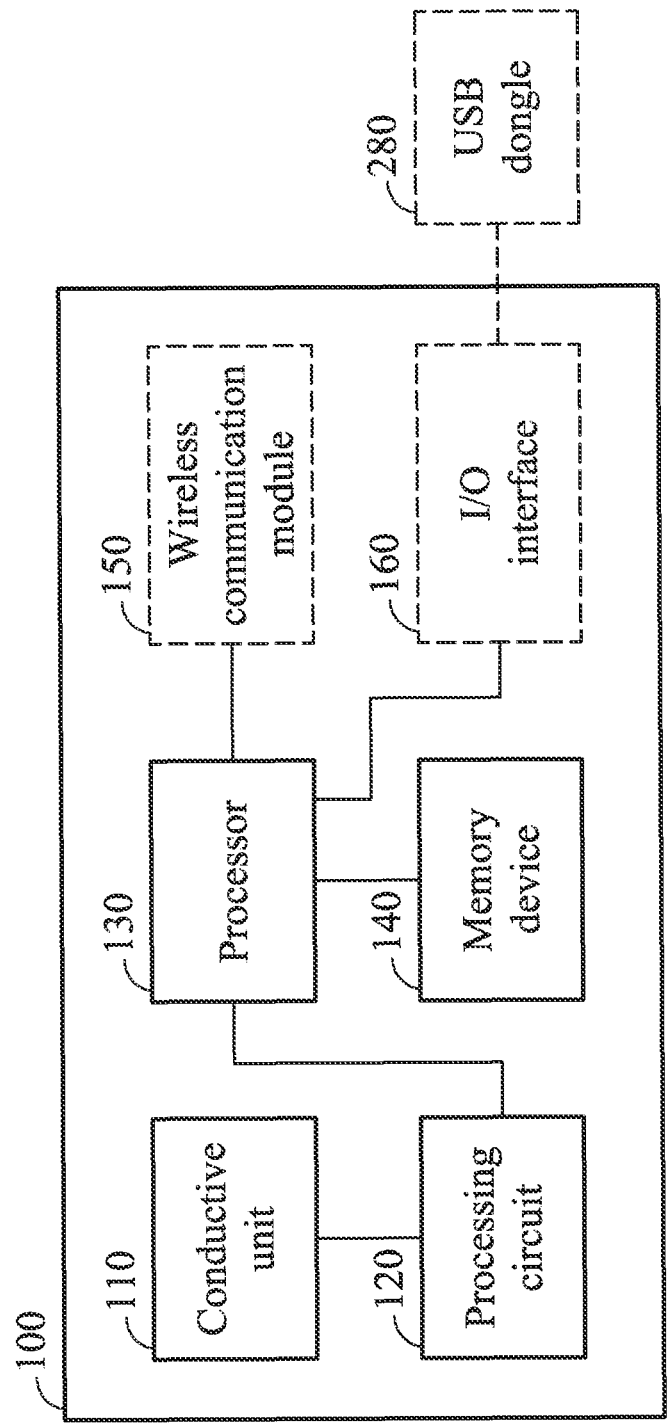
FIG. 1 is a block diagram of an electronic device according to an embodiment of the invention.

FIG. 1 is a block diagram of an electronic device according to an embodiment of the invention. The electronic device 100 may comprise at least a conductive unit 110, a processing circuit 120, a processor 130, and a memory device 140. The conductive unit 110 may be configured for transmitting a first signal to the conductive unit of another electronic device and receiving a second signal from the conductive unit of another electronic device based on the touch link technology illustrated above. The processing circuit 120 is coupled to the conductive unit 110, and configured for processing the first signal and providing the first signal to the conductive unit 110 and receiving the second signal from the conductive unit 110 and processing the second signal. The processor 130 may be a general purpose processor with a predefined instruction set, such as a digital signal processor (DSP) or a central processing unit (CPU), or a specific purpose processor, such as an application-specific integrated circuit (ASIC), and may be configured for controlling operations of at least the conductive unit 110, the processing circuit 120 and the memory device 140. The memory device 140 may be configured for storing system data.

According to some embodiments of the invention, the electronic device 100 may further comprise a wireless communication module 150 and an I/O interface 160. The wireless communication module 150 may be configured for supporting wireless communication in compliance with a predefined protocol, such as the Bluetooth protocol, the WiFi protocol, or others. The I/O interface 160 may be any type of interface, such as a USB interface. The processor 130 may be further coupled to the wireless communication module 150 and the I/O interface 160 for controlling operations thereof.

According to an embodiment of the invention, the processing circuit 120 may also be a general purpose processor, such as a DSP, a CPU, or a specific purpose processor, such as an ASIC. In addition, note that in some embodiments of the invention, the processing circuit 120 and the processor 130 may be fabricated in a single chip, e.g., a system-on-chip (SoC). As an example, the processing circuit 120 includes an analog circuit and a digital circuit. The analog circuit may provide the operation such as signal filtering, amplification and analog-to-digital conversion; the digital circuit may function to demodulate signal come from the analog circuit by using some common digital communication and signal processing techniques.

Figure 2:
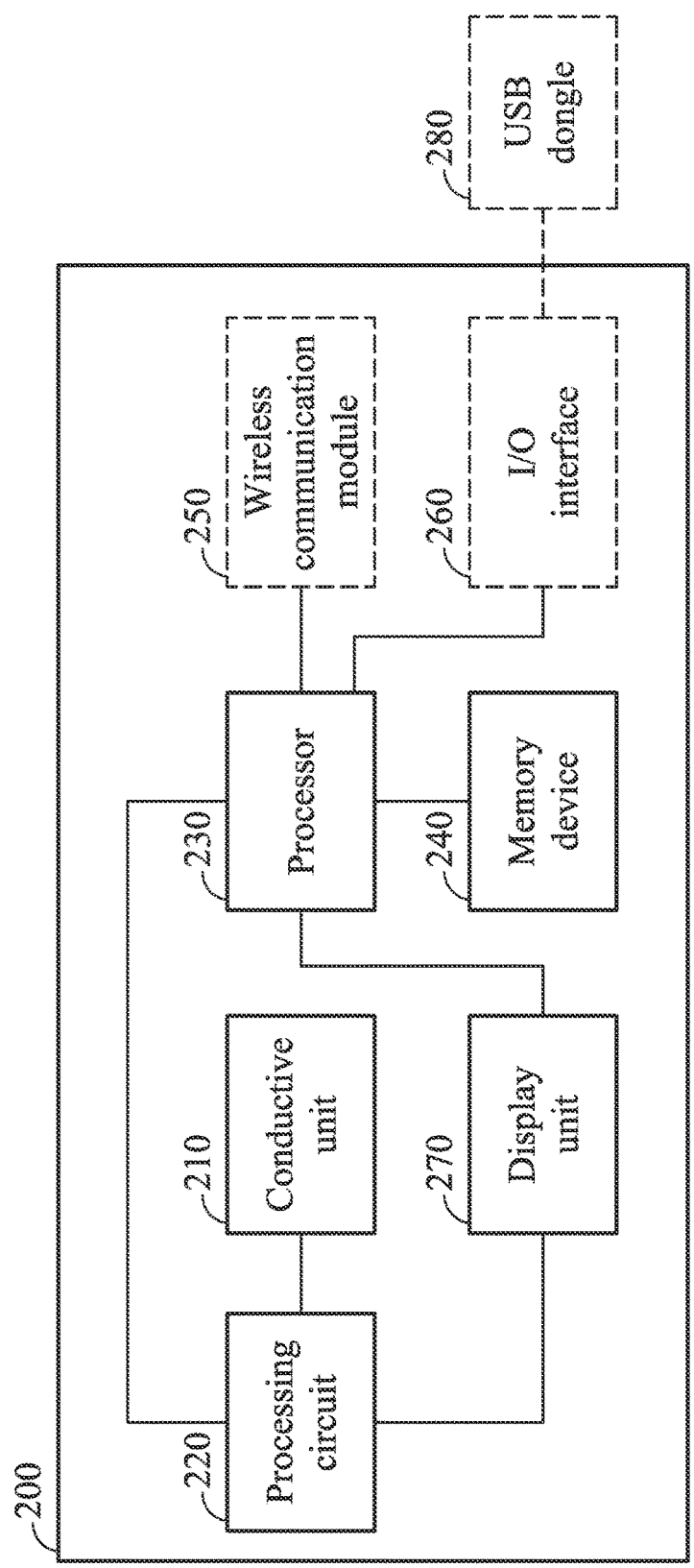
FIG. 2 is a block diagram of an electronic device according to another embodiment of the invention.

FIG. 2 is a block diagram of an electronic device according to another embodiment of the invention. The electronic device 200 may comprise at least a conductive unit 210, a processing circuit 220, a processor 230, a memory device 240 and a display unit 270. The conductive unit 210 may be configured for transmitting a first signal to the conductive unit of another electronic device and receiving a second signal from the conductive unit of another electronic device based on the touch link technology illustrated above. The processing circuit 220 is coupled to the conductive unit 210, and configured for processing the first signal and providing the first signal to the conductive unit 210 and receiving the second signal from the conductive unit 210 and processing the second signal. The processor 230 may be a general purpose processor, such as a digital signal processor (DSP) or a central processing unit (CPU), or a specific purpose processor, such as an application-specific integrated circuit (ASIC), and may be configured for controlling operations of at least the conductive unit 210, the processing circuit 220, the memory device 240 and the display unit 270. The first signal may be provided to the processing circuit 220 by the processor 230 and the second signal may be processed by the processor 230. The memory device 240 may be configured for storing system data. The display unit 270 may be configured for displaying image data such as a liquid crystal display (LCD) screen, and may be a display unit attached with or without touch-controlled functionality. For one example, the display unit has a LCD screen with a touch panel on top of the LCD screen. For another example, the display unit is simply a LCD screen or other type of screen without touch-controlled capability. For still another example, the display unit is a LCD screen with built in touch panel functionality, which is termed as a "In-Cell" touch panel. To detect a touch event of a user touching a position of the touch panel of the display unit 270, a analog signal is generated correspondingly because of the capacitance variation around the position of the touch panel. The processing circuit 220 processes this analog signal through filtering, amplification and analog-to-digital conversion to generate an intermediate signal. The intermediate signal may then be processed and computed by the processor 230 to generate a digital symbol. To display a image corresponding to the touch event, the processor sends a electrical signal, according to the digital symbol, to the display unit 270. A driver circuit, not drawn in FIG. 2 for sake of brevity, of the LCD screen of the display unit 270 then converts the electrical signal so as to drive the LCD screen to display the desired image.

According to some embodiments of the invention, the electronic device 200 may further comprise a wireless communication module 250 and an I/O interface 260. The wireless communication module 250 may be configured for supporting wireless communication in compliance with a predefined protocol, such as the Bluetooth protocol, the WiFi protocol, or others. The I/O interface 260 may be any type of interface, such as a USB interface. The processor 230 may be further coupled to the wireless communication module 250 and the I/O interface 260 for controlling operations thereof.

According to an embodiment of the invention, the processing circuit 220 may also be a general purpose processor, such as a DSP, a CPU, or a specific purpose processor, such as an ASIC. In addition, note that in some embodiments of the invention, the processing circuit 220 may further be integrated into the processor 230 as the same processor device, and the invention should not be limited to either case of implementation.

According to an embodiment of the invention, the conductive unit 110/210 may be a touch-sense device, a flexible printed circuit (FPC) or a printed circuit board (PCB) and the conductive unit 110/210 may comprise one or more metal traces routed thereon. Note that ITO can also be used to serve as the conductive unit 110/210. Flexible electronics is a technology for assembling electronic circuits by mounting electronic devices on flexible plastic substrates, such as polyimide, Polyether ether ketone (PEEK) or transparent conductive polyester film. Flexible electronic assemblies may be manufactured using identical components used for rigid printed circuit boards, allowing the board to conform to a desired shape, or to flex during its use. The flexible printed circuits (FPC) are made with a photolithographic technology.

Unlike the conventional touch link technology as illustrated above, in which the near field wireless communication is established by using the original touch-controlled panel and the corresponding hardware devices, in the embodiments of the invention, the near field wireless communication can be established by using the the conductive unit 110/210. To do this, some minor hardware revision on conventional touch link device may be needed, which will be treated in more detail later. Therefore, when establishing the near field wireless communication via the conductive unit 110/210, operations of the original touch-controlled panel (such as the display unit 270 shown in FIG. 2) will not be affected or interrupted. For example, when establishing the near field wireless communication via the conductive unit 210, the display unit 270 is still operative to detect touch event and/or display image. Note that besides using two conductive units for wireless communication, it is feasible to do wireless communication between a conductive unit and a touch panel based on touch link technology.

In addition, in the embodiments of the invention, unlike the touch-controlled panel (such as the display unit 270 shown in FIG. 2), which is always disposed in the front of the electronic device 200 for displaying image data, the conductive unit 110/210 may be disposed in any part of the electronic device 100/200, such as deployed on one of the front, rear, left, right, top, and bottom side of the electronic device 100/200, or it can even be hidden from view. Therefore, a user can operate on touch-controlled panel while establishing the touch link connection via the conductive unit at the same time when the electronic device comprises both the touch-controlled panel and the conductive unit. For example, the user may control the procedure of the touch link connection via the touch-controlled panel.

Here, the term "hidden from view" means that the user of the electronic device 100/200 may be unable to see the conductive unit 110/210 from the appearance of the electronic device 100/200 since the conductive unit 110/210 may be covered by the case or shell of the electronic device 100/200.

In the embodiments of the invention, although the conductive unit 110/210 may be hidden from view, as long as another electronic device supporting the touch link technology is disposed close enough (for example, 2 cm in proximity) to the electronic device 100/200, the near field wireless communication can be successfully established between these two electronic devices.

Figure 3:
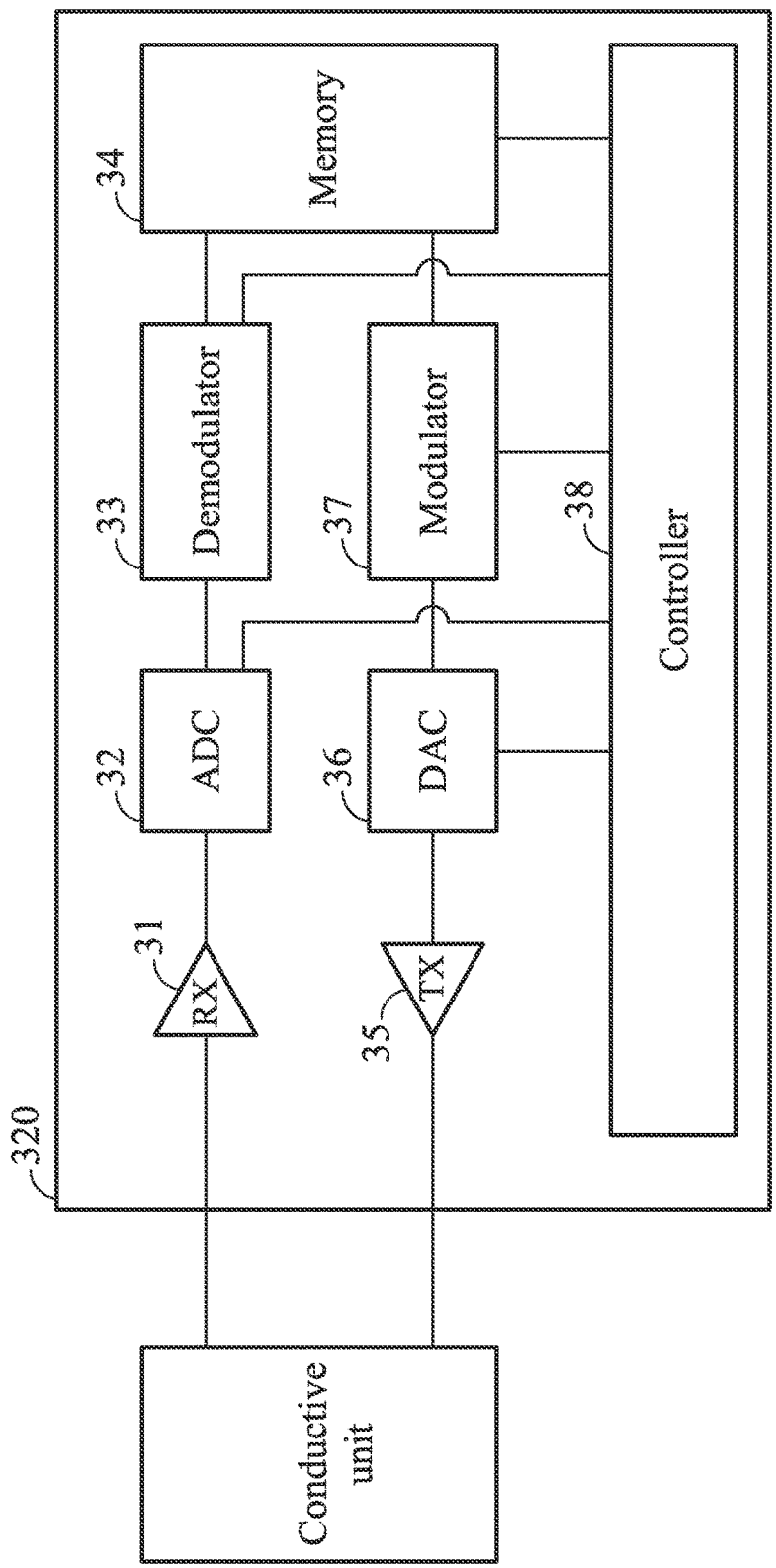
FIG. 3 is a block diagram of a processing circuit according to an embodiment of the invention.

FIG. 3 is a block diagram of a processing circuit according to an embodiment of the invention. The processing circuit 320 coupled to the conductive unit may comprise an analog receiving front-end circuit RX 31, an analog to digital converter ADC 32, a demodulator 33, a memory 34, an analog transmitting front-end circuit TX 35, a digital to analog converter DAC 36, a modulator 37 and a controller 38. The controller 38 may be configured for controlling operations of the RX 31, the ADC 32, the demodulator 33, the memory 34, the TX 35, the DAC 36 and the modulator 37. The memory 34 may be configured for storing received data or the data to be transmitted. When performing data or signal transmission, the modulator 37 may be configured for modulating the data to be transmitted as a first signal. The DAC 36 may be configured for performing digital to analog conversion on the first signal. The TX 35 may be configured for performing front-end signal processing on the first signal, and then providing the first signal to the conductive unit. Driven by the processing circuit 320, the conductive unit then transmits first signal via the metal trace(s) by electric field coupling.

When performing data or signal reception, the conductive unit receives a second signal via the metal trace(s) by electric field coupling. The RX 31 receiving the second signal from the conductive unit is then configured for performing front-end signal processing on the second signal, and then providing the second signal to the ADC 32. The ADC 32 may be configured for performing analog to digital conversion on the second signal. The demodulator 33 may be configured for demodulating the second signal. According to an embodiment of the invention, the controller 38 may be further configured for determining the transmitting frequency utilized for transmitting the first signal and the receiving frequency utilized for receiving the second signal. According to an embodiment of the invention, the components in the processing circuit 320 may be implemented on an IC.

Figure 4:
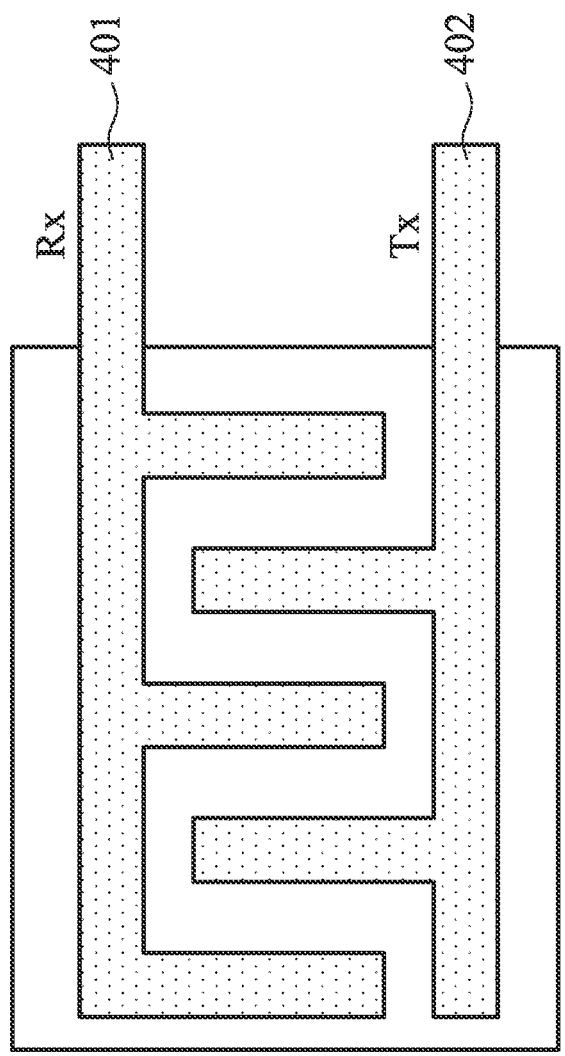
FIG. 4 shows an exemplary layout of the metal traces on the conductive unit according to an embodiment of the invention.

FIG. 4 shows an exemplary layout of the metal traces on the conductive unit according to an embodiment of the invention. In the embodiment, there may be two metal traces 401 and 402 routed on the conductive unit, one is coupled to the analog receiving front-end circuit RX of the processing circuit and the other is coupled to the analog transmitting front-end circuit TX. Hence, the metal trace 401 is served as a transmitting electrode and the metal trace 402 is served as a receiving electrode of the touch link technology. Note that FIG. 4 merely shows one of a plurality of possible layout embodiments, and the invention should not be limited thereto. In addition, the conductive unit may also comprise only one metal trace or more than two metal traces, and the invention should not be limited thereto. When the conductive unit comprises only one (or, more than one) metal trace, the one (or more) metal trace may be shared for both the transmitting and receiving operations in a time-division manner.

Figure 5:
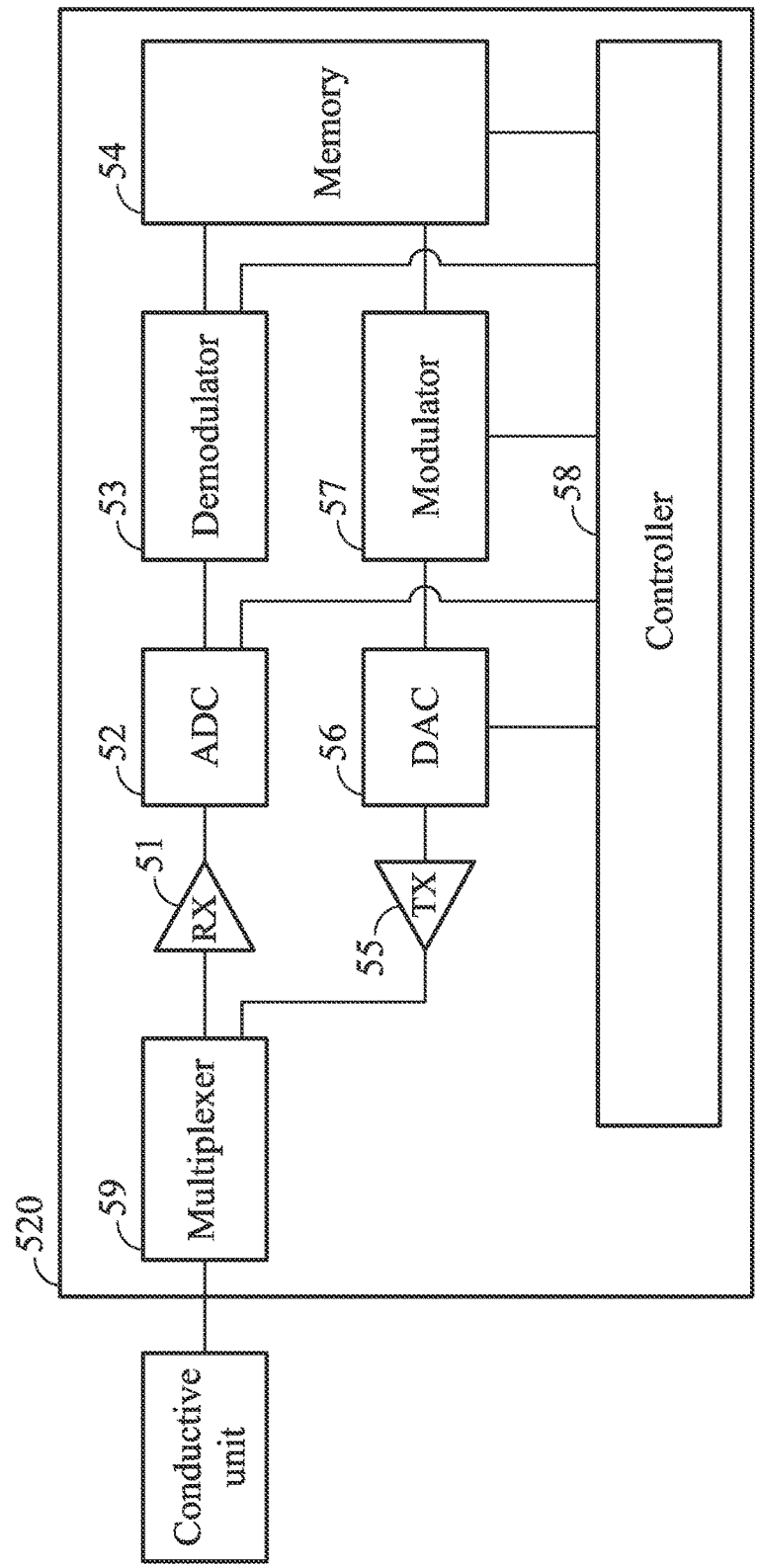
FIG. 5 is a block diagram of a processing circuit according to another embodiment of the invention.

FIG. 5 is a block diagram of a processing circuit according to another embodiment of the invention. The processing circuit 520 coupled to the conductive unit may comprise an analog receiving front-end circuit RX 51, an analog to digital converter ADC 52, a demodulator 53, a memory 54, an analog transmitting front-end circuit TX 55, a digital to analog converter DAC 56, a modulator 57, a controller 58 and a multiplexer 59. The operations of the RX 51, the ADC 52, the demodulator 53, the memory 54, the TX 55, the DAC 56, the modulator 57 and the controller 58 are similar to the RX 31, the ADC 32, the demodulator 33, the memory 34, the TX 35, the DAC 36, the modulator 37 and the controller 38 as illustrated above. Therefore, for the descriptions of the RX 51, the ADC 52, the demodulator 53, the memory 54, the TX 55, the DAC 56, the modulator 57 and the controller 58, reference may be made to the descriptions of the RX 31, the ADC 32, the demodulator 33, the memory 34, the TX 35, the DAC 36, the modulator 37 and the controller 38, and are omitted here for brevity.

In the embodiment of the invention, one (or more) metal trace of the conductive unit is (are) shared in a time-division manner. To be more specific, when performing data or signal transmission, the one (or more) metal trace of the conductive unit is (are) utilized for transmitting the data or signal, and when performing data or signal reception, the one (or more) metal trace of the conductive unit is (are) utilized for receiving the data or signal. The multiplexer 59 is coupled between the conductive unit and the processing circuit 520 for multiplexing the data or signal received from the conductive unit to the RX 51 and the data or signal received from the TX 55 to the conductive unit in a time-division manner.

According to yet another embodiment of the invention, the processing circuit may also be the touch controller of a touch panel (also called a touch-controlled panel) when the electronic device comprises the touch panel. In some embodiments of the invention, the touch panel may be the display unit 270 shown in FIG. 2. In addition, in some embodiments of the invention, the touch panel may comprise a transmitting electrode configured for transmitting a third signal and a receiving electrode, configured for receiving a fourth signal.

Figure 6:
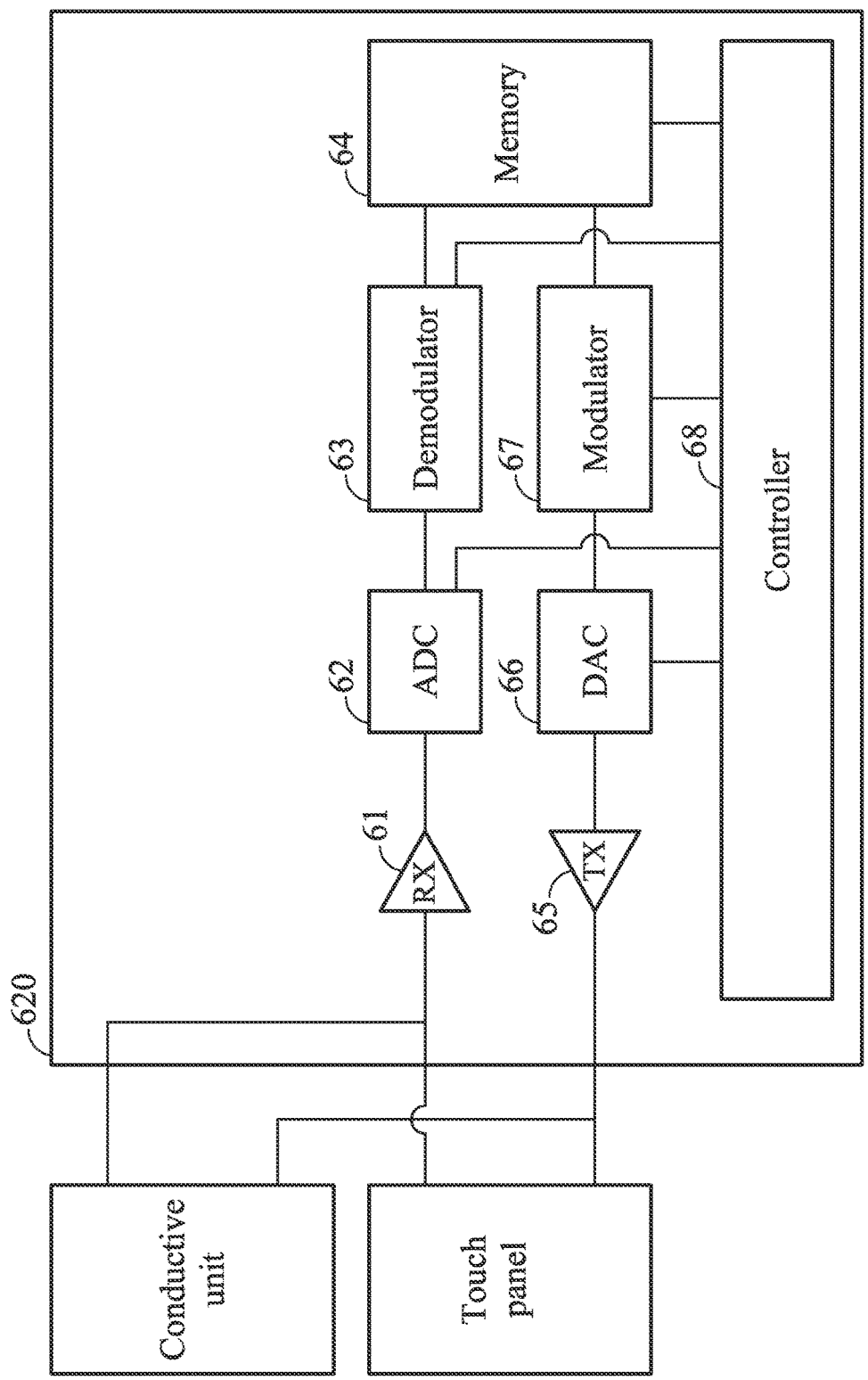
FIG. 6 is a block diagram of a processing circuit according to yet another embodiment of the invention.

FIG. 6 is a block diagram of a processing circuit according to yet another embodiment of the invention. The processing circuit 620 coupled to the conductive unit and the touch panel may comprise an analog receiving front-end circuit RX 61, an analog to digital converter ADC 62, a demodulator 63, a memory 64, an analog transmitting front-end circuit TX 65, a digital to analog converter DAC 66, a modulator 67 and a controller 68. The operations of the RX 61, the ADC 62, the demodulator 63, the memory 64, the TX 65, the DAC 66, the modulator 67 and the controller 68 are similar to the RX 31, the ADC 32, the demodulator 33, the memory 34, the TX 35, the DAC 36, the modulator 37 and the controller 38 as illustrated above. Therefore, for the descriptions of the RX 61, the ADC 62, the demodulator 63, the memory 64, the TX 65, the DAC 66, the modulator 67 and the controller 68, reference may be made to the descriptions of the RX 31, the ADC 32, the demodulator 33, the memory 34, the TX 35, the DAC 36, the modulator 37 and the controller 38, and are omitted here for brevity.

In the embodiment of the invention, the conductive unit and the touch panel share the processing circuit 620. Therefore, the processing circuit 620 may process the signal and data received from the conductive unit and the touch panel, and process the signal and data to be transmitted to the conductive unit and the touch panel. Note that in some embodiments of the invention, one or more multiplexers may also be disposed between the conductive unit, the touch panel and the processing circuit 620. As a person with ordinary skill in the art will easily derive the block diagram of a processing circuit with one or more multiplexers comprised therein, the corresponding figure and descriptions are omitted here for brevity.

Figure 7:
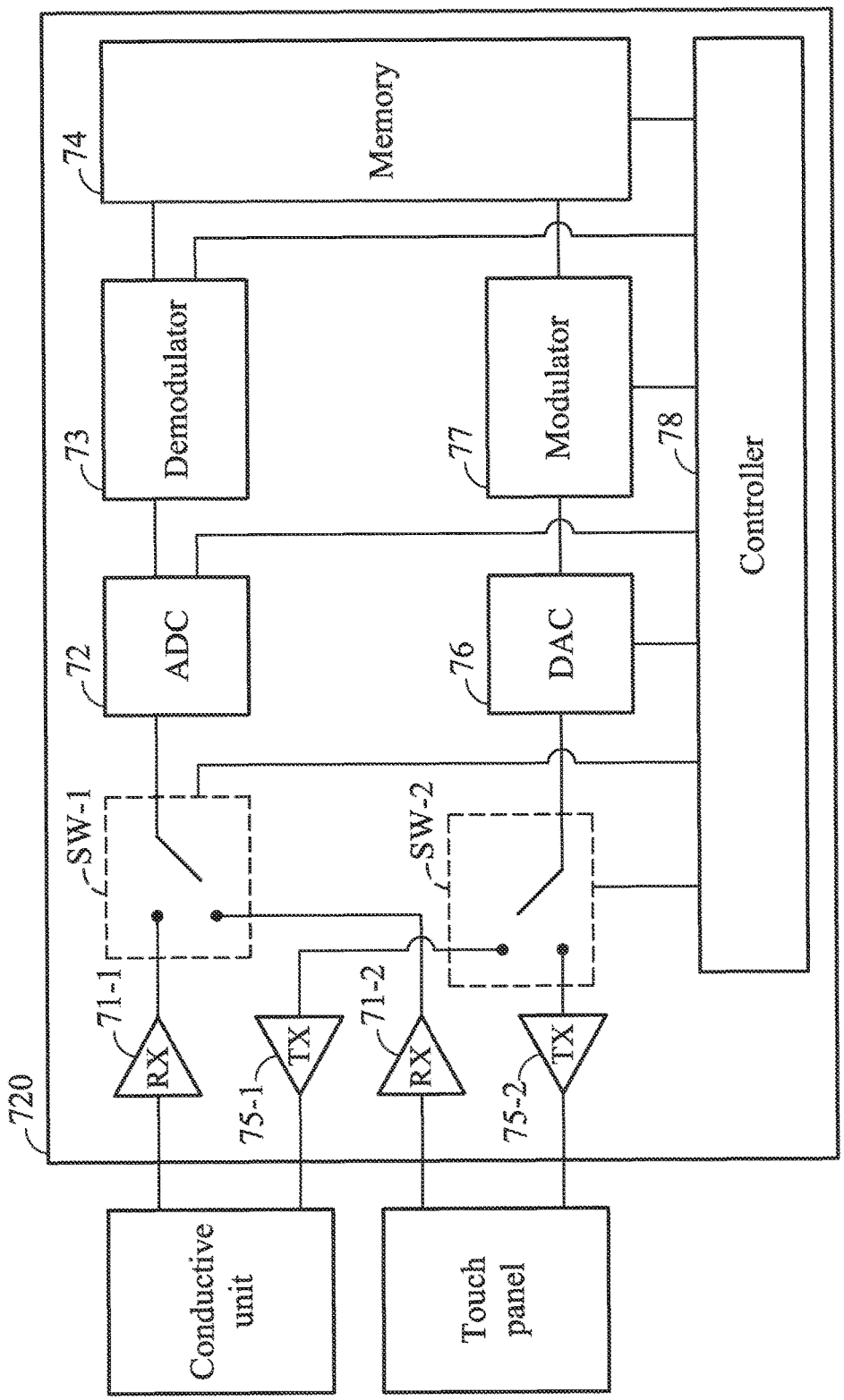
FIG. 7 is a block diagram of a processing circuit according to still another embodiment of the invention.

FIG. 7 is a block diagram of a processing circuit according to still another embodiment of the invention. The processing circuit 720 coupled to the conductive unit and the touch panel may comprise two analog receiving front-end circuits RX 71-1 and RX 71-2, an analog to digital converter ADC 72, a demodulator 73, a memory 74, two analog transmitting front-end circuits TX 75-1 and TX 75-2, a digital to analog converter DAC 76, a modulator 77, a controller 78 and two switches SW-1 and SW-2. The operations of the RX 71-1 and RX 71-2, the ADC 72, the demodulator 73, the memory 74, the TX 75-1 and TX 75-2, the DAC 76, the modulator 77 and the controller 78 are similar to the RX 31, the ADC 32, the demodulator 33, the memory 34, the TX 35, the DAC 36, the modulator 37 and the controller 38 as illustrated above. Therefore, for the descriptions of the RX 71-1 and RX 71-2, the ADC 72, the demodulator 73, the memory 74, the TX 75-1 and TX 75-2, the DAC 76, the modulator 77 and the controller 78, reference may be made to the descriptions of the RX 31, the ADC 32, the demodulator 33, the memory 34, the TX 35, the DAC 36, the modulator 37 and the controller 38, and are omitted here for brevity.

In the embodiment of the invention, the conductive unit and the touch panel share most components of the processing circuit 720, except for the analog transmitting front-end circuit TX and the analog receiving front-end circuit RX. The switch SW-1 is controlled by the controller 78 and configured for selectively switching the signal and data received from the RX 71-1 and RX 71-2 to the ADC 72. The switch SW-2 is controlled by the controller 78 and configured for selectively switching the signal and data received from the DAC 76 to the TX 75-1 and TX 75-2.

According to an embodiment of the invention, the conductive unit 110/210 may be deployed on one of the front, rear, left, right, top, and bottom side of the electronic device 100/200. In addition, the conductive unit 110/210 may be the original conductive unit comprised in any hardware device of the electronic device 100/200, such as the FPC or PCB of any hardware device of the electronic device 100/200, including a touch panel or the display unit 270 as shown in FIG. 2. In addition, in some embodiments of the invention, the conductive unit 210 and the touch panel 270 may be deployed on different sides of the electronic device 200.

Since the conductive unit 110/210 may be deployed on any side of the electronic device 100/200, there are no limitations to the placement of two electronic devices to initiate and participate in the near field communication.

Suppose there are two electronic devices Device A and Device B in a near field communication system participating in the near field communication (that is, the near field wireless communication). Both Device A and Device B are capable of supporting the touch link technology. When Device A is in proximity with Device B, a touch link connection can be established there between and Device A and Device B can perform touch link communication with each other. Note that the strength of the electric field relates to the distance between Device A and Device B and the frequency utilized for transmission. Therefore, the touch link connection can be established between Device A and Device B only when Device A and Device B are placed close enough to induce strong enough electric field for the near field communication.

Figure 8B:
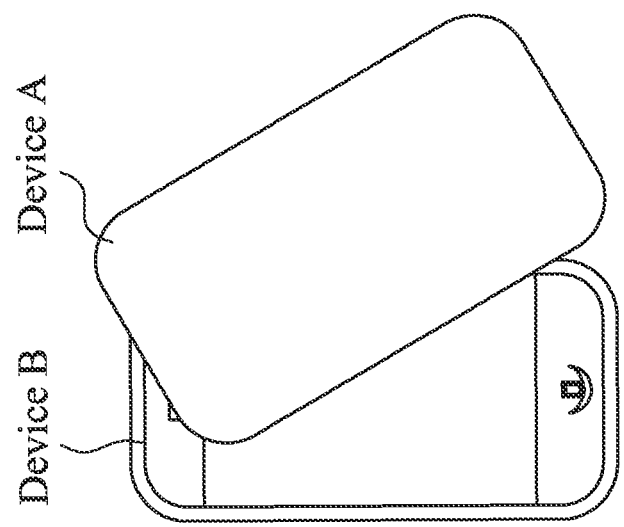
FIG. 8B shows another exemplary placement of two electronic devices in a near field communication system according to another embodiment of the invention.
Figure 8A:
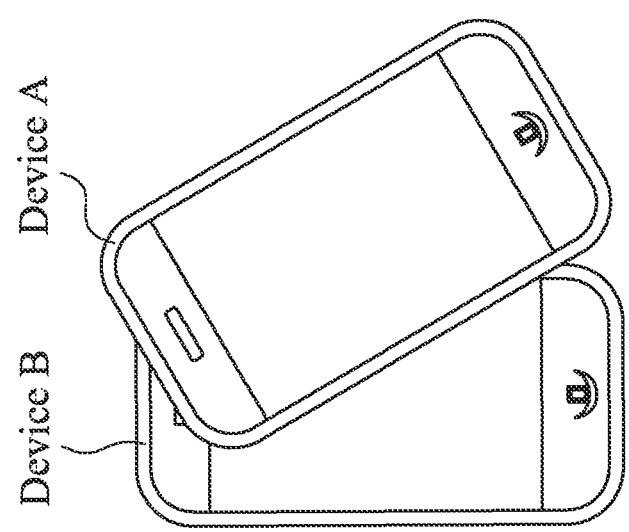
FIG. 8A shows an exemplary placement of two electronic devices in a near field communication system according to an embodiment of the invention.

FIG. 8A shows an exemplary placement of two electronic devices in a near field communication system according to an embodiment of the invention. In this embodiment, Device A comprises a conductive unit on its rear side and Device B comprises a conductive unit or a touch panel on its front side. Once Device A and Device B are placed close enough as shown in FIG. 8A, a touch link connection can be established there between and Device A and Device B can perform touch link communication with each other. Note that Device B is capable of receiving and transmitting a signal based on touch link technology via the conductive unit or the touch panel or both, and the invention should not be limited thereto.

FIG. 8B shows another exemplary placement of two electronic devices in a near field communication system according to another embodiment of the invention. In this embodiment, Device A comprises a conductive unit or a touch panel on its front side and Device B comprises a conductive unit or a touch panel on its front side. Once Device A and Device B are placed close enough as shown in FIG. 8B, a touch link connection can be established there between and Device A and Device B can perform touch link communication with each other. Note that Device A and Device B are capable of receiving and transmitting a signal based on touch link technology via the conductive unit or the touch panel or both the conductive unit and the touch panel, and the invention should not be limited thereto.

Figure 8D:
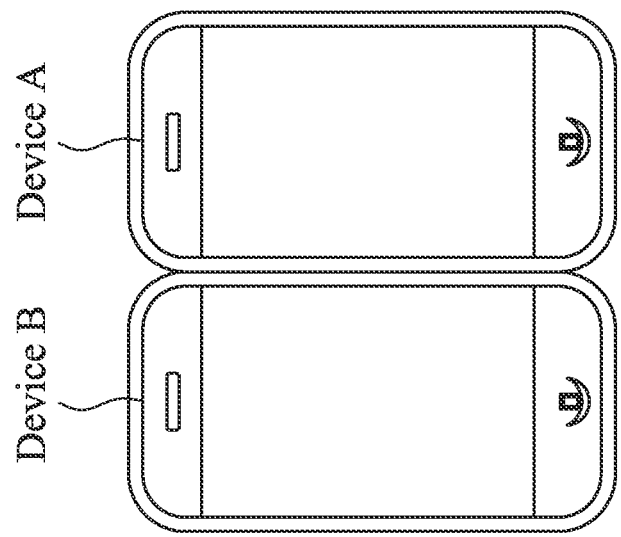
FIG. 8D shows still another exemplary placement of two electronic devices in a near field communication system according to still another embodiment of the invention.
Figure 8C:
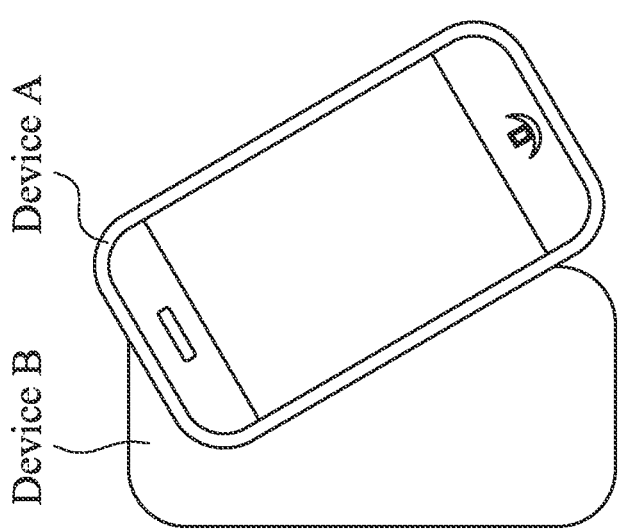
FIG. 8C shows yet another exemplary placement of two electronic devices in a near field communication system according to yet another embodiment of the invention.

FIG. 8C shows yet another exemplary placement of two electronic devices in a near field communication system according to yet another embodiment of the invention. In this embodiment, Device A comprises a conductive unit on its rear side and Device B comprises a conductive unit on its rear side. Once Device A and Device B are placed close enough as shown in FIG. 8C, a touch link connection can be established there between and Device A and Device B can perform touch link communication with each other.

FIG. 8D shows still another exemplary placement of two electronic devices in a near field communication system according to still another embodiment of the invention. In this embodiment, Device A comprises a conductive unit on its left side and Device B comprises a conductive unit on its right side. Once Device A and Device B are placed close enough as shown in FIG. 8D, a touch link connection can be established there between and Device A and Device B can perform touch link communication with each other.

Note that FIGS. 8A-8D merely shows a portion of a plurality of possible placements of two electronic devices in a near field communication system, and the invention should not be limited thereto. In addition, when an electronic device is equipped with the conductive unit, the electronic device is capable of receiving and transmitting a signal based on touch link technology via the conductive unit. When an electronic device is equipped with the touch panel, the electronic device is capable of receiving and transmitting a signal based on touch link technology via the touch panel. When an electronic device is equipped with both the conductive unit and the touch panel, the electronic device is capable of receiving and transmitting a signal based on touch link technology via the conductive unit, the touch panel, or both.

According to an embodiment of the invention, when establishing a touch link connection between two electronic devices, the two electronic devices may first perform a handshake procedure for authentication. The two electronic devices may exchange identity information in the handshake procedure via the equipped conduct unit or touch panel based on the touch link technology. Next, the two electronic devices may perform an adaptive modulation procedure to determine one or more proper frequency utilized for transmission and reception. Next, the two electronic devices may perform a version verification procedure to verify the software versions and the touch link communication capabilities. When the above procedures are completed, signal and/or data transmission may begin between the two electronic devices based on the touch link technology. In some embodiments of the invention, the two electronic devices may directly exchange signal and/or data based on the touch link technology. In other embodiments of the invention, the two electronic devices may further exchange essential information for establishing another wireless communication link (such as a WiFi communication link, a Bluetooth communication link, or other) based on the touch link technology, and then establishing such wireless communication link via the wireless communication module (such as the wireless communication modules 150 and 250 as shown in FIG. 1 and FIG. 2).

Figure 9:
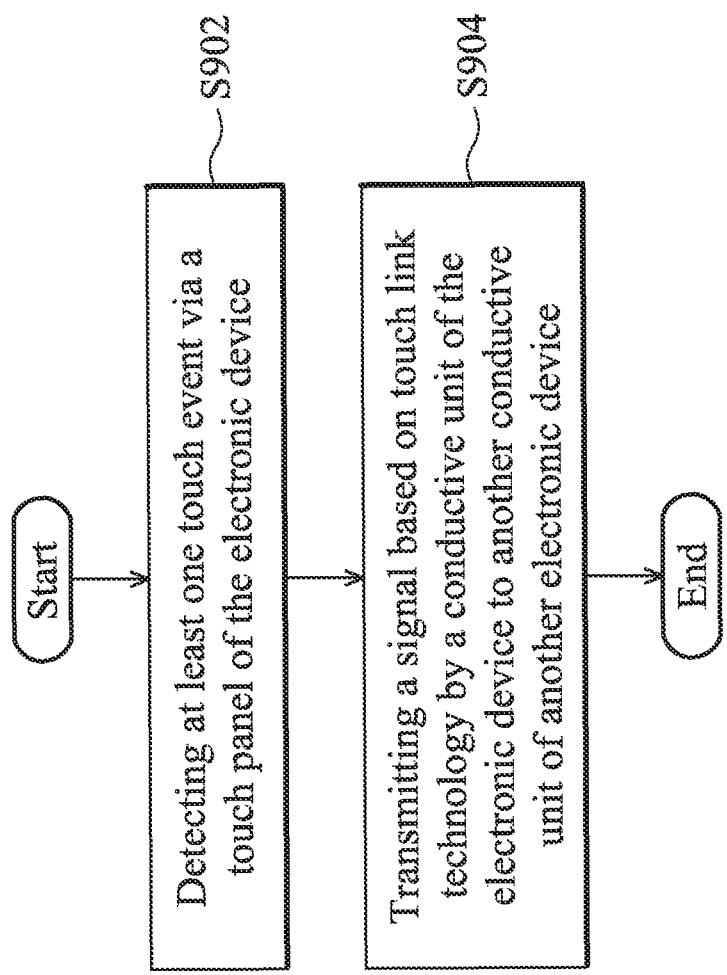
FIG. 9 is a flow chart of a near field communication method according to an embodiment of the invention.

FIG. 9 is a flow chart of a near field communication method according to an embodiment of the invention. In the embodiment, the near field communication is triggered when the user touches a touch panel of an electronic device. When at least one touch event is detected via the touch panel of the electronic device (Step S902), a signal is transmitted based on touch link technology by a conductive unit of the electronic device to another conductive unit of another electronic device (Step S904). In the embodiment, the conductive unit of the electronic device comprises at least a transmitting electrode and a receiving electrode. In addition, in the embodiment, the conductive unit of another electronic device may be a ITO coating of a touch panel, a PCB, a FPC, or other conductive material as discussed above.

According to some other embodiments of the invention, the conductive unit may not necessarily be comprised inside of the electronic device, or the touch link technology may be carried out by a conductive unit outside of and coupled to of the electronic device. For example, suppose an electronic device (such as the electronic device 100/200, or other electronic device not comprising any conductive unit or touch panel capable of supporting the touch link technology) has an interface which is coupled to a conductive unit. The interface may be a USB interface, and the conductive unit capable of supporting the touch link technology may be comprised in a USB dongle (such as the USB dongle 280 shown in FIG. 1 and FIG. 2). When the USB dongle is electrically coupled to the electronic device, the electronic device is capable of supporting the touch link technology and establishing a touch link connection via the conductive unit in the USB dongle. Hence, the conductive unit may be detachable from the electronic device.

Therefore, in the embodiments of the invention, for an electronic device that does not comprise any conductive unit or touch panel capable of supporting the touch link technology, the touch link technology can still be carried out by electrically coupling such a USB dongle device to the electronic device. In this manner, the near field communication function can be provided by any existing electronic devices.

In addition, as discussed above, unlike the conventional touch link technology, in which the near field wireless communication is established by using the original touch-controlled panel and the corresponding hardware devices, in the embodiments of the invention, the near field wireless communication is established by the conductive unit. Therefore, when establishing the near field wireless communication via the conductive unit, operations of the original touch-controlled panel (when equipped) will not be affected or interrupted. For example, when establishing the near field wireless communication via the conductive unit 210, the display unit 270 is still operative to detect touch event and/or display image.

In addition, in the embodiments of the invention, the conductive unit may be disposed in any part of the electronic device, such as deployed on one of the front, rear, left, right, top, and bottom side of the electronic device, or can even be hidden from view. Therefore, a user can operate on touch-controlled panel while establishing the touch link connection via the conductive unit at the same time when the electronic device comprise both the touch-controlled panel and the conductive unit. For example, the user may control the procedure of the touch link connection, including selecting the data or file to be transmitted, via the touch-controlled panel. In this manner, the convenience and practicability of the touch link technology are greatly improved.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A first electronic device, comprising:
    a display unit, comprising a touch sensor configured to detect a user touch event;
    a first conductive unit, comprising one or more metal traces routed thereon and configured to transmit a first signal to a second conductive unit of a second electronic device when the first conductive unit is in proximity with the second conductive unit; and
    a processing circuit, configured for providing the first signal to the first conductive unit,
    wherein the first conductive unit comprises a transmitting electrode and a receiving electrode, and
    wherein the display unit is configured to detect the user touch event at the same time the first conductive unit is transmitting the first signal to the second conductive unit of the second electronic device, and detection of the user touch event overlaps at least partially in time with the transmission of the first signal to the second conductive unit of the second electronic device.

2. The first electronic device as claimed in claim 1, wherein the first conductive unit is further configured for receiving a second signal from the second conductive unit of the second electronic device.

3. The first electronic device as claimed in claim 1, wherein the first conductive unit is a flexible printed circuit (FPC).

4. The first electronic device as claimed in claim 1, wherein the first conductive unit is a printed circuit board (PCB) hidden from view.

5. The first electronic device as claimed in claim 1, wherein the first conductive unit is deployed on one of the front, rear, left, right, top, or bottom side of the first electronic device.

6. The first electronic device as claimed in claim 1, wherein the display unit is a touch panel, and the first conductive unit and the touch panel are deployed on different sides of the first electronic device.

7. The first electronic device as claimed in claim 6, wherein when the first conductive unit transmits the first signal, the touch panel is operative to detect a touch event.

8. The first electronic device as claimed in claim 6, wherein the touch panel comprises:
a transmitting electrode, configured for transmitting a third signal; and
a receiving electrode, configured for receiving a fourth signal.

9. The first electronic device as claimed in claim 1, wherein the first conductive unit is detachable from the first electronic device.

10. A near field communication method for using in a first electronic device, comprising:
detecting at least one touch event via a touch panel of the first electronic device; and
transmitting, according to the at least one touch event, a signal by a first conductive unit to a second conductive unit when the first conductive unit is in proximity with the second conductive unit,
wherein the first conductive unit comprises at least one metal trace routed thereon and serving as a transmitting electrode and at least one metal trace routed thereon and serving as a receiving electrode, and wherein the touch panel is configured to detect the at least one touch event at the same time the first conductive unit is transmitting the signal to the second conductive unite, and detection of the at least one touch event overlaps at least partially in time with transmission of the signal to the second conductive unit.

11. The method as claimed in claim 10, wherein the first conductive unit is a flexible printed circuit or a printed circuit board.

12. The method as claimed in claim 10, wherein the first conductive unit and the touch panel of the first electronic device are deployed on different sides of the first electronic device.

13. The method as claimed in claim 10, wherein the second conductive unit is one of a touch panel, flexible printed circuit, or a printed circuit board.

14. The method as claimed in claim 10, wherein the first conductive unit is deployed on one of the front, rear, left, right, top, or bottom side of the first electronic device.

15. The method as claimed in claim 10, wherein the first conductive unit is on a dongle electrically coupled to the first electronic device through an interface.

16. The method as claimed in claim 10, wherein the second conductive unit is deployed on one of the front, rear, left, right, top, or bottom side of a second electronic device.

17. The first electronic device as claimed in claim 2, wherein the first signal and the second signal are wireless signals.

18. The first electronic device as claimed in claim 1, wherein the first conductive unit is disposed outside of the touch panel.

19. The method as claimed in claim 10, wherein the signal is a wireless signal.

20. The method as claimed in claim 10, wherein the touch panel comprises a transmitting electrode and a receiving electrode which are different from the transmitting electrode and the receiving electrode of the first conductive unit.

* * * * *